US011520568B2

(12) United States Patent
Kadiyala

(10) Patent No.: US 11,520,568 B2
(45) Date of Patent: Dec. 6, 2022

(54) METHOD AND SYSTEM FOR DEVELOPMENT AND TRACKING OF DYNAMIC DATA LINEAGE

(71) Applicant: JPMorgan Chase Bank, N.A., New York, NY (US)

(72) Inventor: Vijaya Kadiyala, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/449,338

(22) Filed: Sep. 29, 2021

(65) Prior Publication Data

US 2022/0100481 A1  Mar. 31, 2022

Related U.S. Application Data

(60) Provisional application No. 63/114,186, filed on Nov. 16, 2020.

(30) Foreign Application Priority Data

Sep. 30, 2020 (IN) .............................. 202011042965

(51) Int. Cl.
*G06F 9/44* (2018.01)
*G06F 8/41* (2018.01)

(52) U.S. Cl.
CPC .................... *G06F 8/433* (2013.01)

(58) Field of Classification Search
None
See application file for complete search history.

(56) References Cited

U.S. PATENT DOCUMENTS

| 10,909,137 B2 * | 2/2021 | Blevins ................ G06F 16/258 |
| 2012/0102417 A1 * | 4/2012 | Li ........................ G06F 3/0484 715/762 |
| 2016/0103757 A1 * | 4/2016 | Liu ..................... G06F 11/3644 717/130 |
| 2020/0019311 A1 * | 1/2020 | Zolotow ................ G06F 3/067 |

\* cited by examiner

*Primary Examiner* — Qamrun Nahar
(74) *Attorney, Agent, or Firm* — Greenblum & Bernstein, P.L.C.

(57) ABSTRACT

A method and a system for dynamically tracking data lineage is provided. The method includes: assigning a first context key to a first data set; inputting the first data set into a first software module; receiving a second data set as an output of the first software module; and assigning a second context key to the second data set. The second context key includes information that identifies the inputted first data set and information that identifies the first software module. When the second data set is subsequently inputted into a second software module, a third context key that identifies the inputted second data set and the second software module is assigned to the resultant output data set.

20 Claims, 8 Drawing Sheets

600

Context Details

| Context Key | Business Date | Context Type | Context Status |
|---|---|---|---|
| 20201007011111 | 10-Jul-20 | Daily | Completed |
| 20201007022222 | 10-Jul-20 | Daily | Completed |
| 20201007033333 | 10-Jul-20 | Daily | Completed |
| 20201007044444 | 10-Jul-20 | Daily | Completed |
| 20201007055555 | 10-Jul-20 | Daily | Completed |
| 20201007066666 | 10-Jul-20 | Daily | Completed |
| 20201007077777 | 10-Jul-20 | Daily | Completed |
| 20201007099999 | 10-Jul-20 | Daily | Completed |
| 20201007044400 | 10-Jul-20 | Aggregation | Completed |
| 20201007066600 | 10-Jul-20 | Aggregation | Completed |

By Data Set - Expiration Date

| Context Key | Data Set Name | Business Date | Expiration Date | No. Of Rows |
|---|---|---|---|---|
| 20201007011111 | Data Set 1 | 10-Jul-20 | 2-Oct-20 | 65234 |
| 20201007022222 | Data Set 2 | 10-Jul-20 | 2-Oct-20 | 87666 |
| 20201007033333 | Data Set 3 | 10-Jul-20 | 2-Oct-20 | 110698 |
| 20201007044444 | Data Set A | 10-Jul-20 | 2-Oct-20 | 132530 |
| 20201007055555 | Data Set B | 10-Jul-20 | 2-Oct-20 | 154962 |
| 20201007066666 | Data Set D | 10-Jul-20 | 2-Oct-20 | 177394 |
| 20201007077777 | Data Set E | 10-Jul-20 | 2-Oct-20 | 199826 |
| 20201007099999 | Data Set F | 10-Jul-20 | 2-Oct-20 | 222258 |
| 20201007066655 | Data Set G | 10-Jul-20 | 2-Oct-20 | 244690 |
| 20201007077777 | Data Set 4 | 10-Jul-20 | 2-Oct-20 | 267122 |
| 20201007099999 | Data Set 5 | 10-Jul-20 | 2-Oct-20 | 289554 |
| 20201007066666 | Data Set C | 10-Jul-20 | 2-Oct-20 | 311986 |
| 20201007044400 | Data Set XX | 10-Jul-20 | 10-Jul-21 | 34545 |
| 20201007044400 | Data Set XY | 10-Jul-20 | 10-Jul-21 | 435.43 |
| 20201007066600 | Data Set XW | 10-Jul-20 | 10-Jul-21 | 23445 |
| 20201007066600 | Data Set XZ | 10-Jul-20 | 10-Jul-21 | 45345 |

Context Dependency

| Input Data Set Name | Input Context | Executable | Output Context | Output Data Set Name |
|---|---|---|---|---|
| Data Set 1 | 20201007011111 | Executable 1 | 20201007077777 | Data Set 4 |
| Data Set 2 | 20201007022222 | Executable 1 | 20201007077777 | Data Set 4 |
| Data Set 3 | 20201007033333 | Executable 1 | 20201007077777 | Data Set 4 |
| Data Set 1 | 20201007011111 | Executable 1 | 20201007077777 | Data Set 5 |
| Data Set 2 | 20201007022222 | Executable 1 | 20201007077777 | Data Set 5 |
| Data Set 3 | 20201007033333 | Executable 1 | 20201007077777 | Data Set 5 |
| Data Set A | 20201007044444 | Executable 2 | 20201007099999 | Data Set C |
| Data Set B | 20201007055555 | Executable 2 | 20201007099999 | Data Set C |
| Data Set D | 20201007066666 | Executable 3 | 20201007066666 | Data Set E |
| Data Set D | 20201007066666 | Executable 3 | 20201007066666 | Data Set F |
| Data Set 5 | 20201007077777 | Executable 4 | 20201007044400 | Data Set XX |
| Data Set C | 20201007099999 | Executable 4 | 20201007044400 | Data Set XX |
| Data Set E | 20201007066666 | Executable 4 | 20201007044400 | Data Set XY |
| Data Set 5 | 20201007077777 | Executable 4 | 20201007044400 | Data Set XY |
| Data Set C | 20201007099999 | Executable 4 | 20201007044400 | Data Set XY |
| Data Set E | 20201007066666 | Executable 4 | 20201007044400 | Data Set XY |
| Data Set 4 | 20201007077777 | Executable 5 | 20201007066600 | Data Set XW |
| Data Set F | 20201007077777 | Executable 5 | 20201007066600 | Data Set XW |
| Data Set G | 20201007066666 | Executable 5 | 20201007066600 | Data Set XW |
| Data Set 4 | 20201007077777 | Executable 5 | 20201007066600 | Data Set XZ |
| Data Set F | 20201007077777 | Executable 5 | 20201007066600 | Data Set XZ |
| Data Set G | 20201007066666 | Executable 5 | 20201007066600 | Data Set XZ |

Actual – Run Time Data Lineage
DAY 1

Context Details

| Context Key | Business Date | Context Type | Expiration Date | Context Status |
|---|---|---|---|---|
| 20201107011111111 | 11-Jul-20 | Daily | | Completed |
| 20201107022222222 | 11-Jul-20 | Daily | | Completed |
| 20201107033333333 | 11-Jul-20 | Daily | | Completed |
| 20201107044444444 | 11-Jul-20 | Daily | | Completed |
| 20201107055555555 | 11-Jul-20 | Daily | | Completed |
| 20201107066666666 | 11-Jul-20 | Daily | | Completed |
| 20201107077777777 | 11-Jul-20 | Daily | | Completed |
| 20201107099999999 | 11-Jul-20 | Daily | | Completed |
| 20201107044443000 | 11-Jul-20 | Aggregation | | Completed |
| 20201107066663000 | 11-Jul-20 | Aggregation | | Completed |

Context Dependency

| Input Data Set Name | Input Context | Executable | Output Context | Output Data Set Name |
|---|---|---|---|---|
| Data Set 1 | 20201107011111111 | Executable 1 | 20201107077777777 | Data Set 4 |
| Data Set 2 | 20201107022222222 | Executable 1 | 20201107077777777 | Data Set 4 |
| Data Set 3 | 20201107033333333 | Executable 1 | 20201107077777777 | Data Set 4 |
| Data Set A | 20201107044444444 | Executable 2 | 20201107099999999 | Data Set C |
| Data Set B | 20201107055555555 | Executable 2 | 20201107099999999 | Data Set C |
| Data Set D | 20201107066666666 | Executable 3 | 20201107066666666 | Data Set E |
| Data Set D | 20201107066666666 | Executable 3 | 20201107066666666 | Data Set F |
| Data Set C | 20201107099999999 | Executable 4 | 20201107044443000 | Data Set XX |
| Data Set E | 20201107066666666 | Executable 4 | 20201107044443000 | Data Set XX |
| Data Set 4 | 20201107077777777 | Executable 5 | 20201107066663000 | Data Set XW |
| Data Set F | 20201107066666666 | Executable 5 | 20201107066663000 | Data Set XW |
| Data Set 4 | 20201107077777777 | Executable 5 | 20201107066663000 | Data Set X2 |
| Data Set F | 20201107066666666 | Executable 5 | 20201107066663000 | Data Set XZ |

By Data Set - Expiration Date

| Context Key | Data Set Name | Business Date | Expiration Date | No. Of Rows |
|---|---|---|---|---|
| 20201107011111111 | Data Set 1 | 11-Jul-20 | 3-Oct-20 | 34323 |
| 20201107022222222 | Data Set 2 | 11-Jul-20 | 3-Oct-20 | 45123 |
| 20201107033333333 | Data Set 3 | 11-Jul-20 | 3-Oct-20 | 51923 |
| 20201107044444444 | Data Set A | 11-Jul-20 | 3-Oct-20 | 60723 |
| 20201107055555555 | Data Set B | 11-Jul-20 | 3-Oct-20 | 69523 |
| 20201107066666666 | Data Set D | 11-Jul-20 | 3-Oct-20 | 78323 |
| 20201107066666666 | Data Set E | 11-Jul-20 | 3-Oct-20 | 87123 |
| 20201107077777777 | Data Set F | 11-Jul-20 | 3-Oct-20 | 95923 |
| 20201107044443000 | Data Set 4 | 11-Jul-20 | 3-Oct-20 | 104723 |
| 20201107099999999 | Data Set C | 11-Jul-20 | 3-Oct-20 | 113523 |
| 20201107066663000 | Data Set XX | 11-Jul-21 | | 45333 |
| 20201107066663000 | Data Set XZ | 11-Jul-21 | | 53432 |

Executable Details

| Executable ID | Executable | Tech Stack | Application ID | Effective Date | End Date |
|---|---|---|---|---|---|
| 1 | Executable 1 | Informatica | 1234 | 1-Jul-20 | 12-Dec-9999 |
| 2 | Executable 2 | Python + Spark | 2345 | 1-Jul-20 | 12-Dec-9999 |
| 3 | Executable 3 | Unix Shell | 3456 | 1-Jul-20 | 12-Dec-9999 |
| 4 | Executable 4 | Java | 4567 | 1-Jul-20 | 12-Dec-9999 |
| 5 | Executable 5 | Oracle PL/SQL | 5678 | 1-Jul-20 | 12-Dec-9999 |

Actual – Run Time Data Lineage

DAY 2

GTVISION

FIG. 8

METHOD AND SYSTEM FOR DEVELOPMENT AND TRACKING OF DYNAMIC DATA LINEAGE

CROSS-REFERENCE TO RELATED APPLICATIONS

This application claims priority benefit from Indian Application No. 202011042965, filed Sep. 30, 2020, which is hereby incorporated by reference in its entirety. This application also claims the benefit of U.S. Provisional Patent Application Ser. No. 63/114,186, filed Nov. 16, 2020, which is hereby incorporated by reference in its entirety.

BACKGROUND

1. Field of the Disclosure

This technology generally relates to methods and systems for tracking data flows, and more particularly, to methods and systems for efficient development and tracking of dynamic data lineage at all stages of code execution.

2. Background Information

Conventional data lineage methodology is primarily concerned with examining a set of software code in order to extract information regarding which data sets are used and which components are configured for inserting and/or modifying the data. This is known as Design Time Data Lineage.

The Design Time Data Lineage methodology fails to capture what exactly happens when the code is being executed, i.e., how the data flows between tables. In this aspect, if the code includes any conditional or controlling statements based on certain conditions that would result in populating data into alternative data sets, then the Design Time Data Lineage is not able to track the lineage of the data.

Accordingly, there is a need for a method for dynamically tracking data lineage at all stages of code execution.

SUMMARY

The present disclosure, through one or more of its various aspects, embodiments, and/or specific features or sub-components, provides, inter alia, various systems, servers, devices, methods, media, programs, and platforms for efficient development and tracking of dynamic data lineage at all stages of code execution.

According to an exemplary embodiment, a method for efficient development and tracking of dynamic data lineage at all stages of code execution is provided. The method is implemented by at least one processor. The method includes: assigning, by the at least one processor, a first context key to a first data set; inputting, by the at least one processor, the first data set into a first software module from among a plurality of software modules; receiving, by the at least one processor, a second data set as an output of the first software module; and assigning, by the at least one processor, a second context key to the second data set, the second context key including information that identifies the inputted first data set and information that identifies the first software module.

The method may further include: assigning, by the at least one processor, a third context key to a third data set; inputting, by the at least one processor, each of the second data set and the third data set into a second software module from among the plurality of software modules; receiving, by the at least one processor, a fourth data set as an output of the second software module; and assigning, by the at least one processor, a fourth context key to the third data set, the fourth context key including information that identifies the inputted second data set, information that identifies the inputted third data set, and information that identifies the second software module.

Each of the first context key and the third context key may include information that uniquely identifies the corresponding data set and information that indicates a source of the corresponding data set.

The method may further include registering each of the plurality of software modules. The information that identifies the first software module and the information that identifies the second software module may be determined based on a result of the registration.

Each of the first context key, the second context key, the third context key, and the fourth context key may include information that indicates a time at which the corresponding data set is originally generated.

The method may further include: receiving a fifth data set that includes an assigned fifth context key; determining, based on the fifth context key, an identification of a third software module from among the plurality of software modules from which the fifth data set is originally generated; and determining, based on the fifth context key, an identification of at least one data set used as an input to the third software module in order to generate the fifth data set.

The method may further include displaying, on a graphical user interface, a result of the tracking of the lineage of data that illustrates a data flow with respect to each of the first data set, the second data set, the third data set, and the plurality of software modules.

The method may further include modifying the displayed result of the tracking of the lineage of data by including an indication that relates to an elimination of at least one data set based on conditional logic provided in at least one from among the plurality of software modules.

The method may further include displaying, on the graphical user interface, a set of tables that correspond to the displayed result of the tracking of the lineage of data.

According to another exemplary embodiment, a computing apparatus for tracking a lineage of data is provided. The computing apparatus includes a processor; a memory; and a communication interface coupled to each of the processor and the memory. The processor is configured to: assign a first context key to a first data set; input the first data set into a first software module from among a plurality of software modules; receive a second data set as an output of the first software module; and assign a second context key to the second data set, the second context key including information that identifies the inputted first data set and information that identifies the first software module.

The processor may be further configured to: assign a third context key to a third data set; input each of the second data set and the third data set into a second software module from among the plurality of software modules; receive a fourth data set as an output of the second software module; and assign a fourth context key to the third data set, the fourth context key including information that identifies the inputted second data set, information that identifies the inputted third data set, and information that identifies the second software module.

Each of the first context key and the third context key may include information that uniquely identifies the corresponding data set and information that indicates a source of the corresponding data set.

The processor may be further configured to register each of the plurality of software modules. The information that identifies the first software module and the information that identifies the second software module may be determined based on a result of the registration.

Each of the first context key, the second context key, the third context key, and the fourth context key may include information that indicates a time at which the corresponding data set is originally generated.

The processor may be further configured to: receive, via the communication interface, a fifth data set that includes an assigned fifth context key; determine, based on the fifth context key, an identification of a third software module from among the plurality of software modules from which the fifth data set is originally generated; and determine, based on the fifth context key, an identification of at least one data set used as an input to the third software module in order to generate the fifth data set.

The processor may be further configured to display, on a graphical user interface, a result of the tracking of the lineage of data that illustrates a data flow with respect to each of the first data set, the second data set, the third data set, and the plurality of software modules.

The processor may be further configured to modify the displayed result of the tracking of the lineage of data by including an indication that relates to an elimination of at least one data set based on conditional logic provided in at least one from among the plurality of software modules.

The processor may be further configured to display, on the graphical user interface, a set of tables that correspond to the displayed result of the tracking of the lineage of data.

According to yet another exemplary embodiment, a non-transitory computer readable storage medium storing instructions for tracking a lineage of data is provided. The storage medium includes executable code which, when executed by a processor, causes the processor to: assign a first context key to a first data set; input the first data set into a first software module from among a plurality of software modules; receive a second data set as an output of the first software module; and assign a second context key to the second data set, the second context key including information that identifies the inputted first data set and information that identifies the first software module.

When executed by the processor, the executable code may further cause the processor to: assign a third context key to a third data set; input each of the second data set and the third data set into a second software module from among the plurality of software modules; receive a fourth data set as an output of the second software module; and assign a fourth context key to the third data set, the fourth context key including information that identifies the inputted second data set, information that identifies the inputted third data set, and information that identifies the second software module.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 6 is a set of tables that shows context key values that correspond to the data lineage of the system illustrated in FIG. 5, according to an exemplary embodiment.

FIG. 8 is a set of tables that shows context key values that correspond to the data lineage of the system illustrated in FIG. 7, according to an exemplary embodiment.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
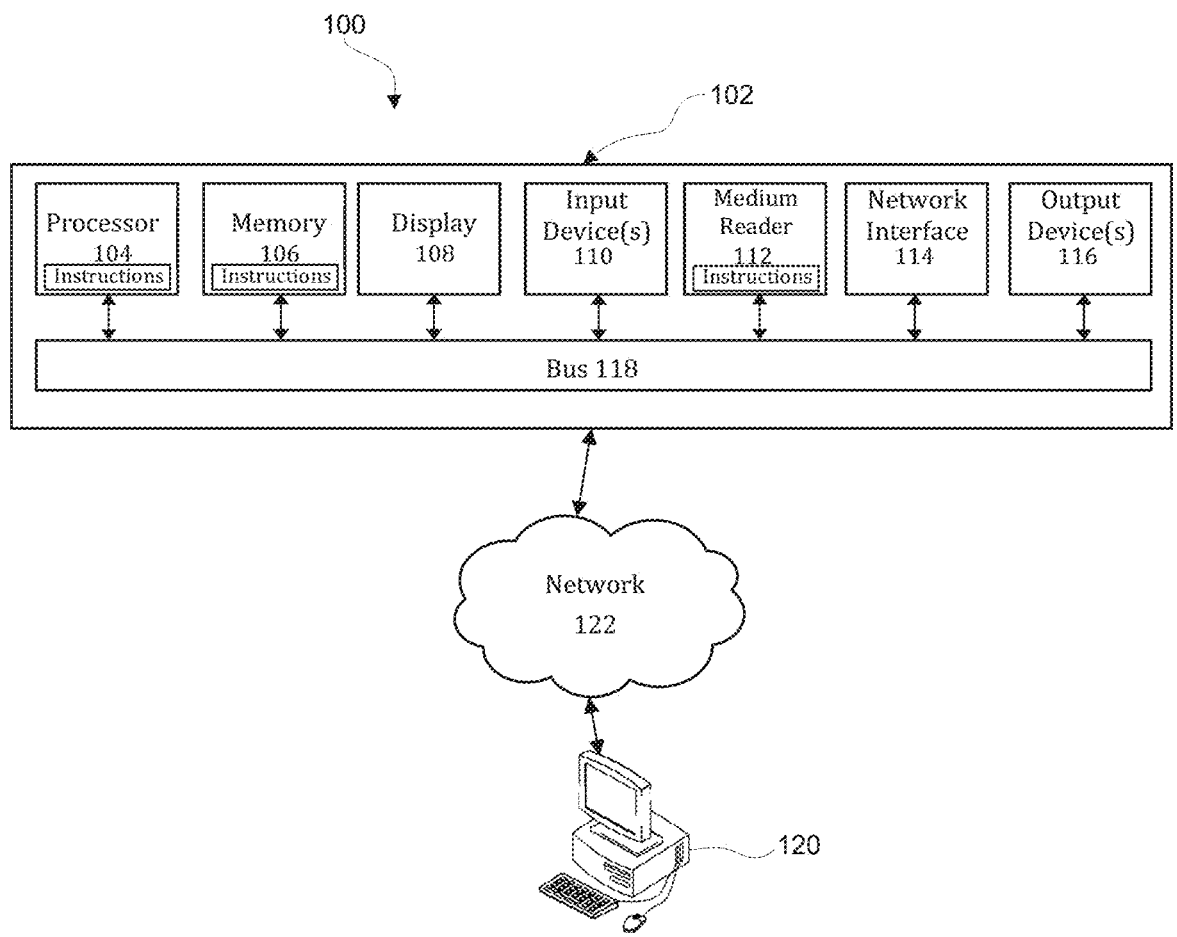
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the computer memory 106, the medium reader 112, and/or the processor 104 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized methods and systems for efficient development and tracking of dynamic data lineage at all stages of code execution.

Figure 2:
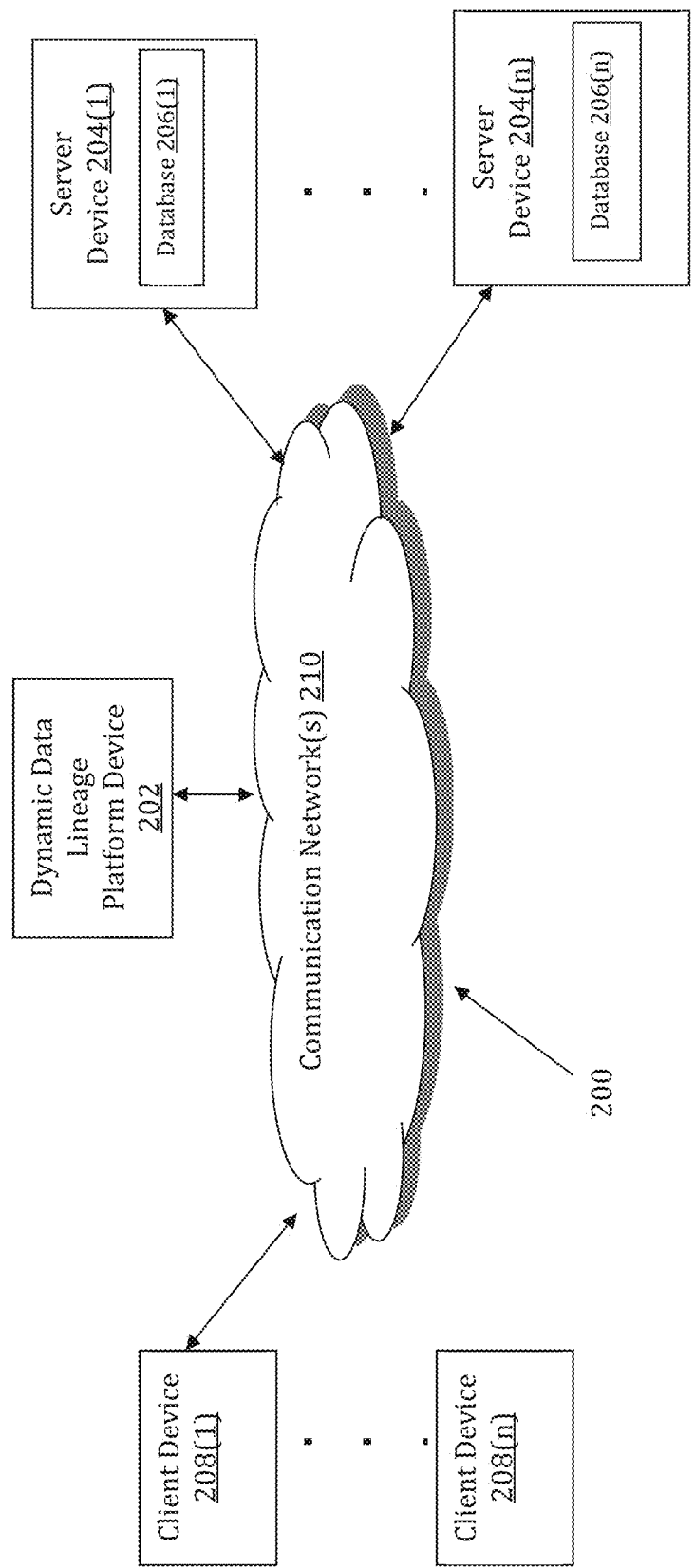
FIG. 2 illustrates an exemplary diagram of a network environment.

Referring to FIG. 2, a schematic of an exemplary network environment 200 for implementing a method for efficient development and tracking of dynamic data lineage is illustrated. In an exemplary embodiment, the method is executable on any networked computer platform, such as, for example, a personal computer (PC).

The method for efficient development and tracking of dynamic data lineage may be implemented by a Dynamic Data Lineage Platform (DDLP) device 202. The DDLP device 202 may be the same or similar to the computer system 102 as described with respect to FIG. 1. The DDLP device 202 may store one or more applications that can include executable instructions that, when executed by the DDLP device 202, cause the DDLP device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DDLP device 202 itself, may be located in virtual server(s) running in a cloud-based computing environment rather than being tied to one or more specific physical network computing devices. Also, the application(s) may be running in one or more virtual machines (VMs) executing on the DDLP device 202. Additionally, in one or more embodiments of this technology, virtual machine(s) running on the DDLP device 202 may be managed or supervised by a hypervisor.

In the network environment 200 of FIG. 2, the DDLP device 202 is coupled to a plurality of server devices 204(1)-204(n) that hosts a plurality of databases 206(1)-206(n), and also to a plurality of client devices 208(1)-208(n) via communication network(s) 210. A communication interface of the DDLP device 202, such as the network interface 114 of the computer system 102 of FIG. 1, operatively couples and communicates between the DDLP device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DDLP device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DDLP devices that efficiently implement a method for efficient development and tracking of dynamic data lineage.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DDLP device 202 may be a standalone device or integrated with one or more other devices or apparatuses, such as one or more of the server devices 204(1)-204(n), for example. In one particular example, the DDLP device 202 may include or be hosted by one of the server devices 204(1)-204(n), and other arrangements are also possible. Moreover, one or more of the devices of the DDLP device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DDLP device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) host the databases 206(1)-206(n) that are configured to store system catalog data and data pertaining to context.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DDLP device 202 via the communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DDLP device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DDLP device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DDLP device 202, the server devices 204(1)-204(n), or the client devices 208(1)-208(n), for example, may be configured to operate as virtual instances on the same physical machine. In other words, one or more of the DDLP device 202, the server devices 204(1)-204(n), or the client devices 208(1)-208(n) may operate on the same physical device rather than as separate devices communicating through communication network(s) 210. Additionally, there may be more or fewer DDLP devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
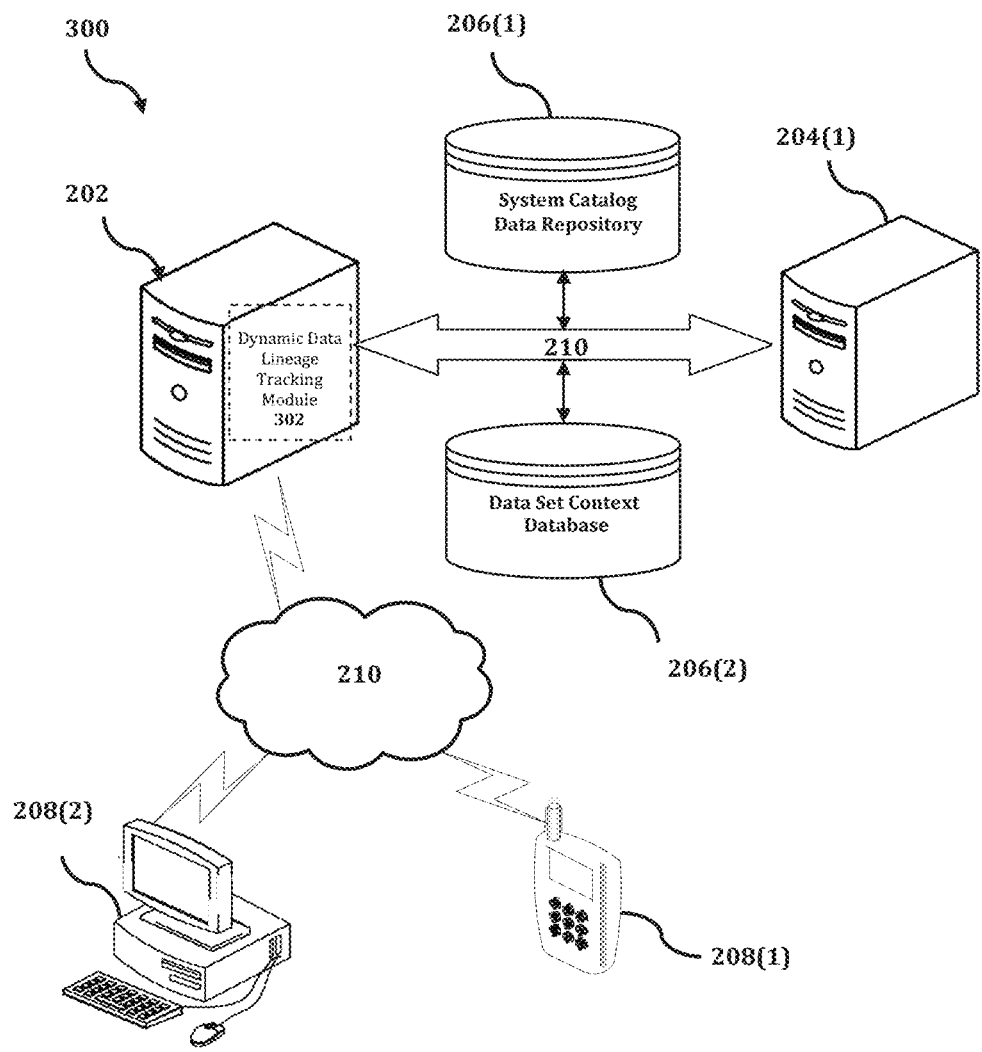
FIG. 3 shows an exemplary system for implementing a method for efficient development and tracking of dynamic data lineage at all stages of code execution.

The DDLP device 202 is described and shown in FIG. 3 as including a dynamic data lineage tracking module 302, although it may include other rules, policies, modules, databases, or applications, for example. As will be described below, the dynamic data lineage tracking module 302 is configured to implement a method for development and tracking of dynamic data lineage in an automated, efficient, scalable, and reliable manner.

An exemplary process 300 for implementing a method for efficient development and tracking of dynamic data lineage by utilizing the network environment of FIG. 2 is shown as being executed in FIG. 3. Specifically, a first client device 208(1) and a second client device 208(2) are illustrated as being in communication with the DDLP device 202. In this regard, the first client device 208(1) and the second client device 208(2) may be "clients" of the DDLP device 202 and are described herein as such. Nevertheless, it is to be known and understood that the first client device 208(1) and/or the second client device 208(2) need not necessarily be "clients" of the DDLP device 202, or any entity described in association therewith herein. Any additional or alternative relationship may exist between either or both of the first client device 208(1) and the second client device 208(2) and the DDLP device 202, or no relationship may exist.

Further, the DDLP device 202 is illustrated as being able to access a system catalog data repository 206(1) and a data set context database 206(2). The dynamic data lineage tracking module 302 may be configured to access these databases for implementing a method for efficient development and tracking of dynamic data lineage.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DDLP device 202 via broadband or cellular communication. Of course, these embodiments are merely exemplary and are not limiting or exhaustive.

Upon being started, the dynamic data lineage tracking module 302 executes a process to perform tracking of dynamic data lineage. An exemplary process for efficient development and tracking of dynamic data lineage is generally indicated at flowchart 400 in FIG. 4.

Figure 4:
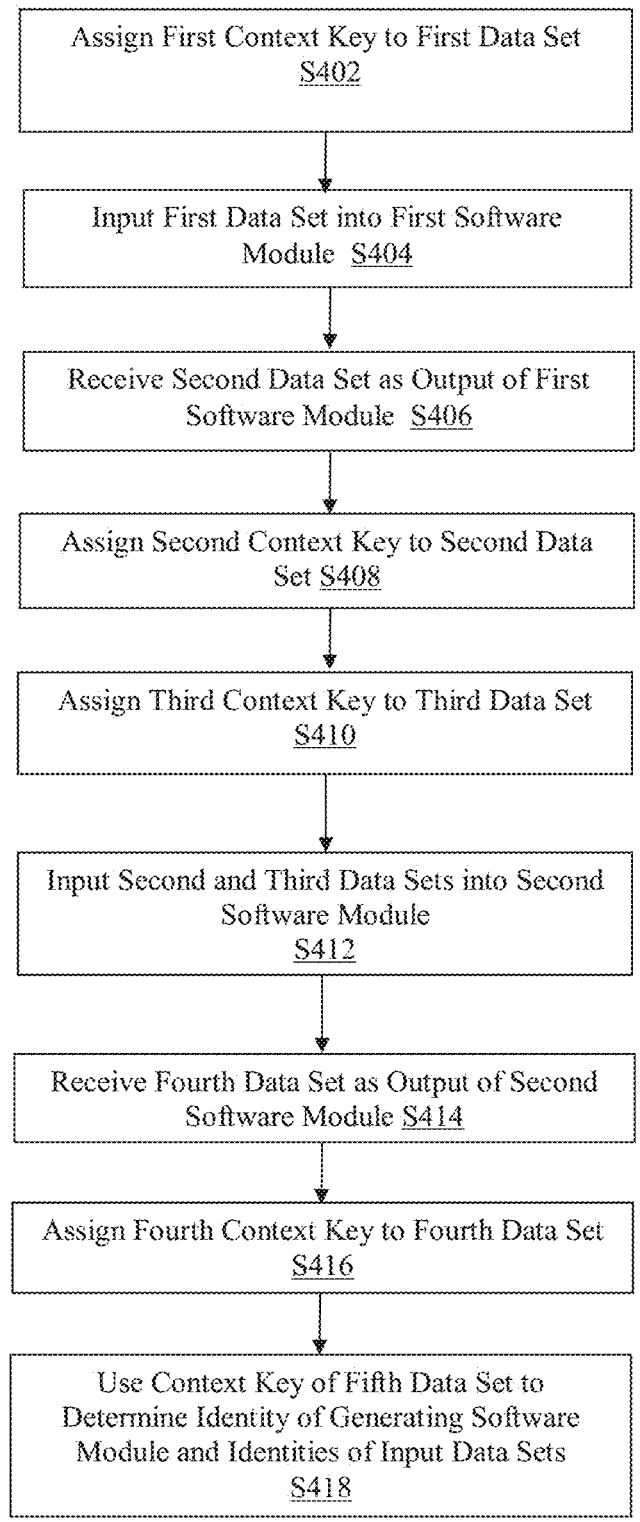
FIG. 4 is a flowchart of an exemplary process for implementing a method for efficient development and tracking of dynamic data lineage at all stages of code execution.

In the process 400 of FIG. 4, at step S402, the dynamic data lineage tracking module 302 assigns a first context key to a first data set that is intended for processing. In an exemplary embodiment, the context key includes information that uniquely identifies the first data set, and also includes information that indicates a source of the first data set. For example, if the first data set was generated as an output of a particular software module, then the first context key may include information that identifies the generating software module. Further, if the generating software module used other data sets as inputs for the execution thereof in order to generate the first data set, then the first context key may include information that identifies each of the inputted data sets. In an exemplary embodiment, the first context key may also include information that indicates a time at which the first data set was originally generated, e.g., a year, a month, and a date of generation.

At step S404, the dynamic data lineage tracking module 302 inputs the first data set into a first software module. In an exemplary embodiment, the first software module may be selected from among a predetermined plurality of software modules, each of which is registered in a registry. The registry may be implemented as a memory that that stores registration numbers for each of the plurality of software modules, such that when a new context key is to be assigned, the information that identifies the generating software module may be retrieved from the registry as the corresponding registration number.

At step S406, the dynamic data lineage tracking module 302 receives a second data set as an output of the first software module. Then, at step S408, the dynamic data lineage tracking module 302 assigns a second context number to the second data set. In an exemplary embodiment, the second context number includes information that identifies the generating software module (i.e., the first software module), the inputted data set(s) (i.e., the first data set and any other data set that may have been used as an input for generating the second data set), and a time at which the second data set was generated.

At step S410, the dynamic data lineage tracking module 302 assigns a third context key to a third data set, and then, at step S412, the dynamic data lineage tracking module 302 inputs each of the second and third data sets into a second software module that is selected from among the plurality of registered software modules. At step S414, the dynamic data lineage tracking module 302 receives a fourth data set as an output of the second software module, and then, at step S416, the dynamic data lineage tracking module assigns a fourth context key to the fourth data set. In an exemplary embodiment, for each assignment of a new context key to a newly generated data set or a newly received data set, the dynamic data lineage tracking module 302 ensures that the context key to be generated includes information that identifies the generating software module(s), the inputted data set(s), and the time and/or date of original generation thereof.

At step S418, the dynamic data lineage tracking module 302 receives a fifth data set for which a context key has previously been assigned. The dynamic data lineage tracking module 302 then uses the already-assigned context key to determine which software module was used to generate the fifth data set, which other data sets were used as inputs for the generation, and a time and/or date of original generation. In this manner, the lineage of the data as it propagates from one software module to the next may be tracked dynamically.

Figure 5:
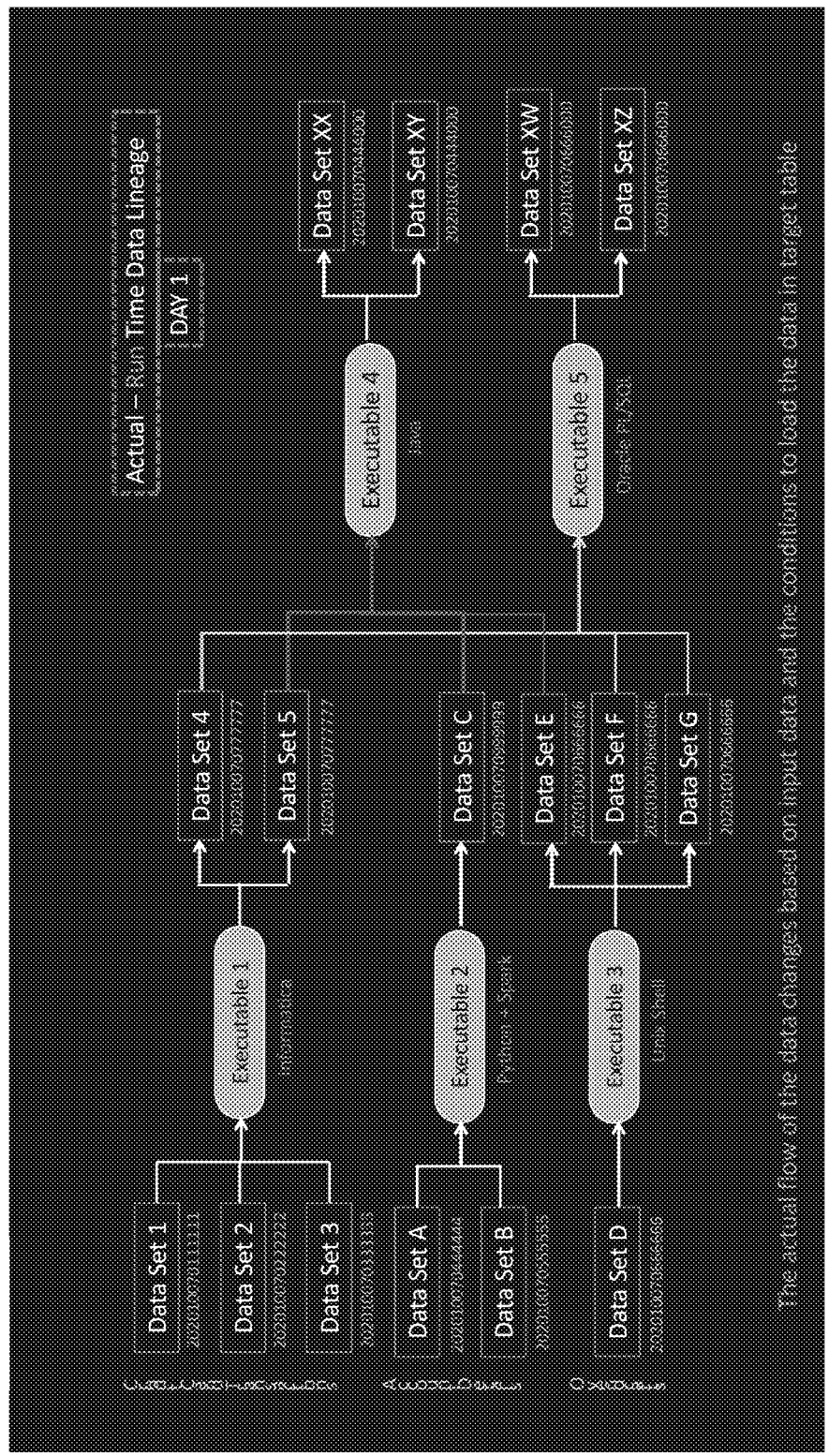
FIG. 5 is a data flow diagram of a system for tracking a dynamic data lineage at all stages of code execution for a first group of data sets, according to an exemplary embodiment.

FIG. 5 is a data flow diagram 500 of a system for tracking a dynamic data lineage at all stages of code execution for a first group of data sets, according to an exemplary embodiment. As illustrated in the diagram 500, an "Actual Run Time Data Lineage Day 1" is shown, and includes several software modules, i.e., Executable 1, Executable 2, Executable 3, Executable 4, and Executable 5; and also includes numerous data sets—some of which are used only as inputs to a software module; some of which are generated as outputs of a software module but are not subsequently inputted into a different software module; and some intermediate data sets that are generated as outputs and then used as inputs to other software modules.

For each data set, a context key is assigned thereto, and the context keys are illustrated as 15-digit numbers that accompany the block for the corresponding data set. In the diagram 500, each of the data sets is originally generated on Jul. 10, 2020, and therefore, the first 8 digits of each context key is identical for all data sets, i.e., "20201007," i.e., "2020" for the year, "10" for the $10^{th}$ day of the month, and "07" for July.

In particular, as shown in FIG. 5, each of Data Set 1, Data Set 2, and Data Set 3 is used as an input to Executable 1, which is shown as being an Informatica software module. The output of Executable 1 is shown as two separate data sets, i.e., Data Set 4 and Data Set 5. Notably, each of Data Set 4 and Data Set 5 is assigned the same context key, because they are actually identical to each other, i.e., both are generated by the same software module at the same time by using the same input data. However, two separate data sets are illustrated, because they are to be used as inputs to two different software modules—i.e., Data Set 4 is used as an input to Executable 5, i.e., an Oracle PL/SQL software module; and Data Set 5 is used as an input to Executable 4, i.e., a Java software module.

As also shown in FIG. 5, each of Data Set A and Data Set B is used as an input to Executable 2, i.e., a Python+Spark software module, and the output is Data Set C, which is then used as an input to Executable 4. Data Set D is used as an input to Executable 3, i.e., a Unix Shell software module, and the outputs are shown as Data Set E, Data Set F, and Data Set G, each of which is assigned the same context key, for consistency with the fact that they are all identical to each other.

Each of Data Set 5, Data Set C, and Data Set E is then used as an input to Executable 4, which generates Data Set XX and Data Set XY as outputs. Each of Data Set 4, Data Set F, and Data Set G is used as an input to Executable 5, which generates Data Set XW and Data Set XZ as outputs. For each data set, a corresponding context key is assigned thereto.

FIG. 6 is a set of tables 600 that shows context key values that correspond to the data lineage of the system illustrated in FIG. 5, according to an exemplary embodiment. In the tables 600, there is a "Context Details" table that lists the context keys for each data set, the date of generation for each data set, a "context type" that indicates a frequency of generation (i.e., "Daily") or a functionality of the generation (i.e., "Aggregation"), and a status of the generation (i.e., "Completed"). There is also a table that illustrates an expiration data for each data set and a number of rows of data included in each data set. Finally, there is a "Context Dependency" table that shows a complete tracking of data sets as they traverse from input to output via executable software modules, each data set being associated with its corresponding context key.

Figure 7:
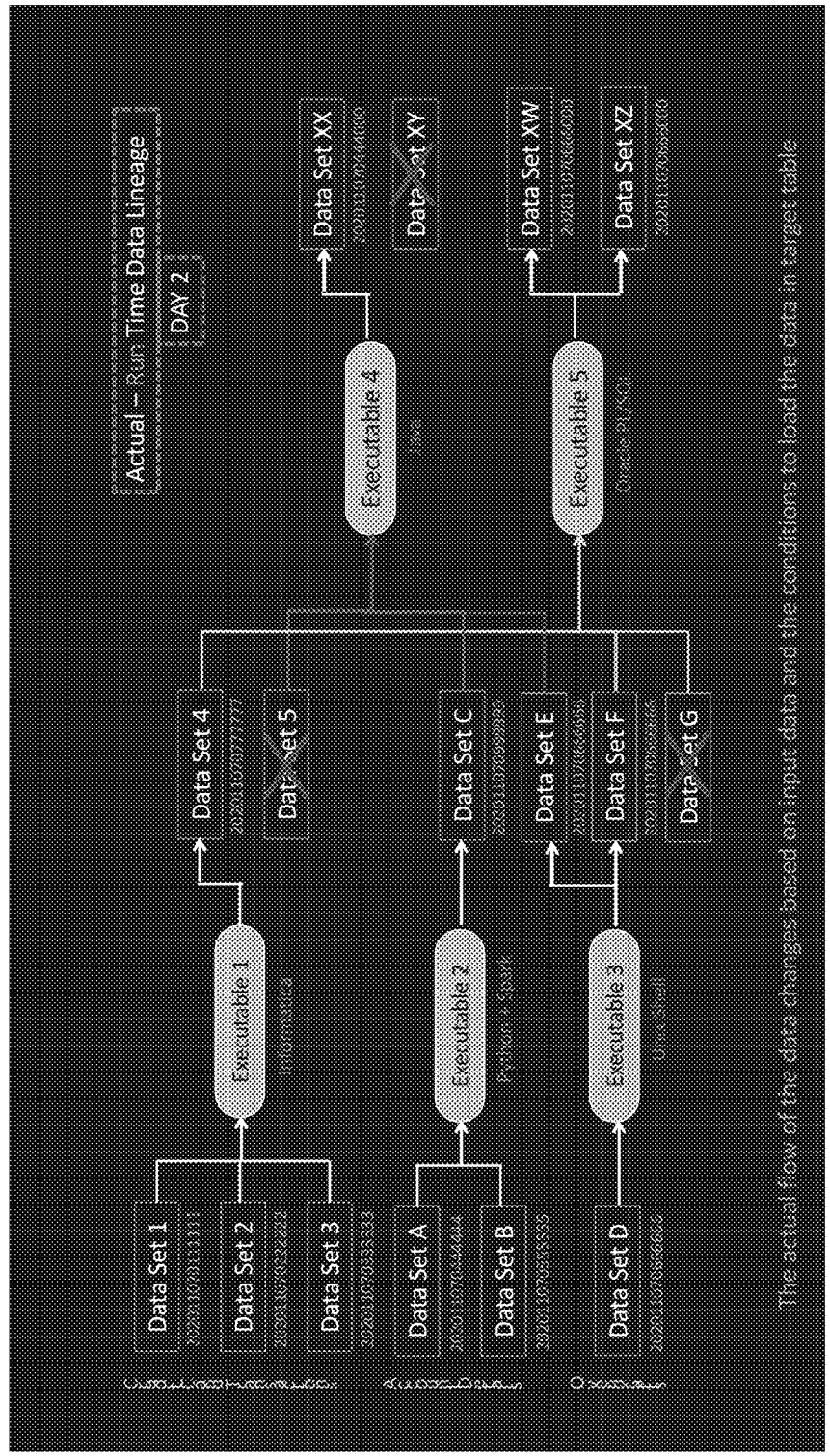
FIG. 7 is a data flow diagram of a system for tracking of dynamic data lineage at all stages of code execution for a second group of data sets, according to an exemplary embodiment.

FIG. 7 is a data flow diagram 700 of a system for tracking of dynamic data lineage at all stages of code execution for a second group of data sets, according to an exemplary embodiment. As illustrated in the diagram 500, an "Actual Run Time Data Lineage Day 2" is shown, and includes the same software modules as those illustrated in FIG. 5. In addition, many of the same data sets are included. Notably, there are two significant differences: First, the assigned context keys are slightly different, because they reflect the date of generation, and because the diagram 700 corresponds to "Day 2," the context key differs in the fifth and sixth digits, i.e., "11" to reflect the $11^{th}$ day of the month, instead of "10" for the $10^{th}$ day of the month. The second difference is that Data Set G and Data Set XY have been eliminated as being redundant and/or based on conditional logic provided in at least one of the software modules. In other respects, the diagram 700 of FIG. 7 is similar to the diagram 500 of FIG. 5.

FIG. 8 is a set of tables 800 that shows context key values that correspond to the data lineage of the system illustrated in FIG. 7, according to an exemplary embodiment. In the aspect, the tables 800 are both similar to and different from the tables 600 as illustrated in FIG. 6 in the same ways that the diagram 700 is similar to and different from the diagram 500. In addition, FIG. 8 also includes an "Executable Details" table that lists relevant information that pertains to each of the five software modules that is included in each of FIG. 5 and FIG. 7.

Accordingly, with this technology, an optimized process for efficient development and tracking of dynamic data lineage at all stages of code execution is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for tracking a lineage of data, the method being implemented by at least one processor, the method comprising:
   assigning, by the at least one processor, a first context key to a first data set;
   inputting, by the at least one processor, the first data set into a first software module from among a plurality of software modules;
   receiving, by the at least one processor, a second data set as an output of the first software module; and
   assigning, by the at least one processor, a second context key to the second data set, the second context key including information that identifies the inputted first data set and information that identifies the first software module.

2. The method of claim 1, further comprising:
   assigning, by the at least one processor, a third context key to a third data set;
   inputting, by the at least one processor, each of the second data set and the third data set into a second software module from among the plurality of software modules;
   receiving, by the at least one processor, a fourth data set as an output of the second software module; and
   assigning, by the at least one processor, a fourth context key to the third data set, the fourth context key including information that identifies the inputted second data set, information that identifies the inputted third data set, and information that identifies the second software module.

3. The method of claim 2, wherein each of the first context key and the third context key includes information that uniquely identifies the corresponding data set and information that indicates a source of the corresponding data set.

4. The method of claim 2, further comprising registering each of the plurality of software modules, wherein the information that identifies the first software module and the information that identifies the second software module is determined based on a result of the registration.

5. The method of claim 4, wherein each of the first context key, the second context key, the third context key, and the fourth context key includes information that indicates a time at which the corresponding data set is originally generated.

6. The method of claim 5, further comprising:
   receiving a fifth data set that includes an assigned fifth context key;
   determining, based on the fifth context key, an identification of a third software module from among the plurality of software modules from which the fifth data set is originally generated; and
   determining, based on the fifth context key, an identification of at least one data set used as an input to the third software module in order to generate the fifth data set.

7. The method of claim 6, further comprising displaying, on a graphical user interface, a result of the tracking of the lineage of data that illustrates a data flow with respect to each of the first data set, the second data set, the third data set, and the plurality of software modules.

8. The method of claim 7, further comprising modifying the displayed result of the tracking of the lineage of data by including an indication that relates to an elimination of at least one data set based on conditional logic provided in at least one from among the plurality of software modules.

9. The method of claim 7, further comprising displaying, on the graphical user interface, a set of tables that correspond to the displayed result of the tracking of the lineage of data.

10. A computing apparatus for tracking a lineage of data, the computing apparatus comprising:
    a processor;
    a memory; and
    a communication interface coupled to each of the processor and the memory,
    wherein the processor is configured to:
      assign a first context key to a first data set;
      input the first data set into a first software module from among a plurality of software modules;
      receive a second data set as an output of the first software module; and
      assign a second context key to the second data set, the second context key including information that identifies the inputted first data set and information that identifies the first software module.

11. The computing apparatus of claim 10, wherein the processor is further configured to:
    assign a third context key to a third data set;
    input each of the second data set and the third data set into a second software module from among the plurality of software modules;
    receive a fourth data set as an output of the second software module; and
    assign a fourth context key to the third data set, the fourth context key including information that identifies the inputted second data set, information that identifies the inputted third data set, and information that identifies the second software module.

12. The computing apparatus of claim 11, wherein each of the first context key and the third context key includes information that uniquely identifies the corresponding data set and information that indicates a source of the corresponding data set.

13. The computing apparatus of claim 11, wherein the processor is further configured to register each of the plurality of software modules, wherein the information that identifies the first software module and the information that identifies the second software module is determined based on a result of the registration.

14. The computing apparatus of claim 13, wherein each of the first context key, the second context key, the third context key, and the fourth context key includes information that indicates a time at which the corresponding data set is originally generated.

15. The computing apparatus of claim 14, wherein the processor is further configured to:
   receive, via the communication interface, a fifth data set that includes an assigned fifth context key;
   determine, based on the fifth context key, an identification of a third software module from among the plurality of software modules from which the fifth data set is originally generated; and
   determine, based on the fifth context key, an identification of at least one data set used as an input to the third software module in order to generate the fifth data set.

16. The computing apparatus of claim 15, wherein the processor is further configured to display, on a graphical user interface, a result of the tracking of the lineage of data that illustrates a data flow with respect to each of the first data set, the second data set, the third data set, and the plurality of software modules.

17. The computing apparatus of claim 16, wherein the processor is further configured to modify the displayed result of the tracking of the lineage of data by including an indication that relates to an elimination of at least one data set based on conditional logic provided in at least one from among the plurality of software modules.

18. The computing apparatus of claim 16, wherein the processor is further configured to display, on the graphical user interface, a set of tables that correspond to the displayed result of the tracking of the lineage of data.

19. A non-transitory computer readable storage medium storing instructions for tracking a lineage of data, the storage medium comprising executable code which, when executed by a processor, causes the processor to:
   assign a first context key to a first data set;
   input the first data set into a first software module from among a plurality of software modules;
   receive a second data set as an output of the first software module; and
   assign a second context key to the second data set, the second context key including information that identifies the inputted first data set and information that identifies the first software module.

20. The storage medium of claim 19, wherein when executed by the processor, the executable code further causes the processor to:
   assign a third context key to a third data set;
   input each of the second data set and the third data set into a second software module from among the plurality of software modules;
   receive a fourth data set as an output of the second software module; and
   assign a fourth context key to the third data set, the fourth context key including information that identifies the inputted second data set, information that identifies the inputted third data set, and information that identifies the second software module.

\* \* \* \* \*